United States Patent
Shepherd et al.

(10) Patent No.: US 10,223,540 B2
(45) Date of Patent: Mar. 5, 2019

(54) METHODS AND SYSTEM FOR IMPLEMENTING A SECURE LOCK SCREEN

(71) Applicant: Apple Inc., Cupertino, CA (US)

(72) Inventors: Matthew E. Shepherd, Mountain View, CA (US); Joshua H. Shaffer, Woodside, CA (US); Chendi Zhang, Cupertino, CA (US); Daniel O. Schimpf, Menlo Park, CA (US); Benjamin E. Nielsen, Sunnyvale, CA (US); Cameron W. Zwarich, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 184 days.

(21) Appl. No.: 14/500,940

(22) Filed: Sep. 29, 2014

(65) Prior Publication Data

US 2015/0347776 A1 Dec. 3, 2015

Related U.S. Application Data

(60) Provisional application No. 62/005,590, filed on May 30, 2014.

(51) Int. Cl.
*G06F 21/62* (2013.01)
*G06F 3/0481* (2013.01)
*G06F 21/31* (2013.01)

(52) U.S. Cl.
CPC ........ *G06F 21/6218* (2013.01); *G06F 3/0481* (2013.01); *G06F 21/31* (2013.01); *G06F 21/6281* (2013.01)

(58) Field of Classification Search
CPC ......... G06F 9/4446; G06F 3/011; G06F 21/31
(Continued)

(56) References Cited

U.S. PATENT DOCUMENTS 8,869,289 B2   10/2014   Dubhashi et al.
8,938,612 B1 *  1/2015   Mittal .................. G06F 21/604
                                                        340/501
(Continued)

FOREIGN PATENT DOCUMENTS

CN   102301641 A   12/2011
CN   102402380 A    4/2012
CN   102446060 A    5/2012

OTHER PUBLICATIONS

Chinese Patent Application No. 201510289288.3—First Office Action dated Nov. 1, 2017.

*Primary Examiner* — Joy M Weber
(74) *Attorney, Agent, or Firm* — Dickinson Wright RLLP

(57) ABSTRACT

Disclosed herein is a technique for implementing a secure lock screen on a computing device. The secure lock screen is configured to permit particular applications to display their content—such as main user interfaces (UIs)—while maintaining a desired overall level of security on the computing device. Graphics contexts, which represent drawing destinations associated with the applications, are tagged with entitlement information that indicates whether or not each graphics context should be displayed on the computing device when the computing device is in a locked-mode. Specifically, an application manager tags each application that is initialized, where the tagging is based on a level of entitlement possessed by the application. In turn, a rendering server that manages the graphics contexts can identify the tagged entitlement information and display or suppress the content of the applications in accordance with their entitlements.

20 Claims, 5 Drawing Sheets

(58) Field of Classification Search
USPC .................................................. 715/807, 708
See application file for complete search history.

(56) References Cited

U.S. PATENT DOCUMENTS

| | | | | |
|---|---|---|---|---|
| 9,076,008 | B1* | 7/2015 | Moy | G06F 21/60 |
| 9,367,672 | B2* | 6/2016 | Eggerton | G06F 21/31 |
| 9,521,247 | B2 | 12/2016 | Bandyopadhyay et al. | |
| 9,699,286 | B2 | 7/2017 | Yun | |
| 2007/0016958 | A1* | 1/2007 | Bodepudi | G06F 21/6218 |
| | | | | 726/27 |
| 2010/0060586 | A1* | 3/2010 | Pisula | G06F 3/04886 |
| | | | | 345/169 |
| 2010/0248689 | A1* | 9/2010 | Teng | H04M 1/67 |
| | | | | 455/411 |
| 2011/0105193 | A1* | 5/2011 | Lee | G06F 3/0488 |
| | | | | 455/566 |
| 2012/0009896 | A1* | 1/2012 | Bandyopadhyay | G06F 1/1643 |
| | | | | 455/411 |
| 2012/0032945 | A1* | 2/2012 | Dare | G06F 3/0481 |
| | | | | 345/418 |
| 2012/0084691 | A1* | 4/2012 | Yun | H04M 1/72519 |
| | | | | 715/769 |
| 2012/0084734 | A1* | 4/2012 | Wilairat | G06F 21/36 |
| | | | | 715/863 |
| 2012/0284297 | A1* | 11/2012 | Aguera-Arcas | G06F 21/629 |
| | | | | 707/769 |
| 2013/0080960 | A1* | 3/2013 | McRae | G06F 3/048 |
| | | | | 715/772 |
| 2013/0326582 | A1* | 12/2013 | Kruzeniski | G06F 21/6209 |
| | | | | 726/2 |
| 2014/0033326 | A1* | 1/2014 | Chien | H04W 12/08 |
| | | | | 726/28 |
| 2014/0184471 | A1* | 7/2014 | Martynov | G06F 3/1423 |
| | | | | 345/1.2 |

* cited by examiner

METHODS AND SYSTEM FOR IMPLEMENTING A SECURE LOCK SCREEN

CROSS-REFERENCE TO RELATED APPLICATIONS

The present application claims the benefit of U.S. Provisional Application No. 62/005,590, entitled "METHODS AND SYSTEM FOR IMPLEMENTING A SECURE LOCK SCREEN" filed May 30, 2014, the content of which is incorporated herein by reference in its entirety for all purposes.

FIELD

The described embodiments set forth a technique for implementing a secure lock screen on a computing device.

BACKGROUND

Recent years have shown a proliferation in the number of individuals who own and operate computing devices (e.g., smartphones and tablets). Typically, an individual uses his or her computing device to carry out different types of activities throughout the day, e.g., placing phone calls, sending and receiving electronic messages, accessing the internet, and the like. Consequently, the level of security of computing devices is being scrutinized due to the sensitivity of the data that is commonly stored on computing devices. This data can include, for example, address book information, email information, photographs, and the like.

One approach that attempts to provide a form of security involves a lock screen that can be manually or automatically engaged. Specifically, when a lock screen is engaged, the lock screen is designed to permit limited functionality to take place—such as placing emergency phone calls, or answering an incoming phone call—but to prevent all other functionality from taking place. Unfortunately, malicious individuals continue to identify different techniques to circumvent the lock screens, which places the security of the average user at risk when his or her computing device is apprehended. These techniques include, for example, tricking the computing device into thinking that the lock screen has been disabled, successfully accessing certain applications while the lock screen is engaged, and the like. Consequently, overall security continues to remain at risk even when conventional lock screens are implemented on computing devices.

SUMMARY

One embodiment sets forth a method for implementing a secure lock screen. The method includes the steps of (1) receiving a request to launch an application, (2) identifying an entitlement associated with the application, where the entitlement indicates whether content of the application is permitted to be displayed when the computing device is in a locked-mode, (3) assigning the entitlement to a graphics context associated with the application, and (4) launching the application.

Another embodiment sets forth a non-transitory computer readable storage medium configured to store instructions that, when executed by a processor included in a computing device, cause the computing device to carry a series of steps. Specifically, the steps can include (1) receiving a request to render a graphics context associated with an application, where the graphics context is associated with an entitlement that indicates whether the graphics context is permitted to be displayed when the computing device is in a locked-mode, (2) determining that the computing device is in the locked-mode, and (3) displaying the graphics context in accordance with the entitlement.

Yet another embodiment sets forth a computing device that includes a display device, a processor, and a memory. Specifically, the memory is configured to store instructions that, when executed by the processor, cause the computing device to carry out steps that include (1) assigning an entitlement to a graphics context associated with an application executing on the computing device, where the entitlement indicates whether the graphics context is permitted to be displayed on the display device when the computing device is in a locked-mode, (2) receiving a request to render the graphics context, (4) determining that the computing device is in the locked-mode, and (5) displaying the graphics context in accordance with the entitlement.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
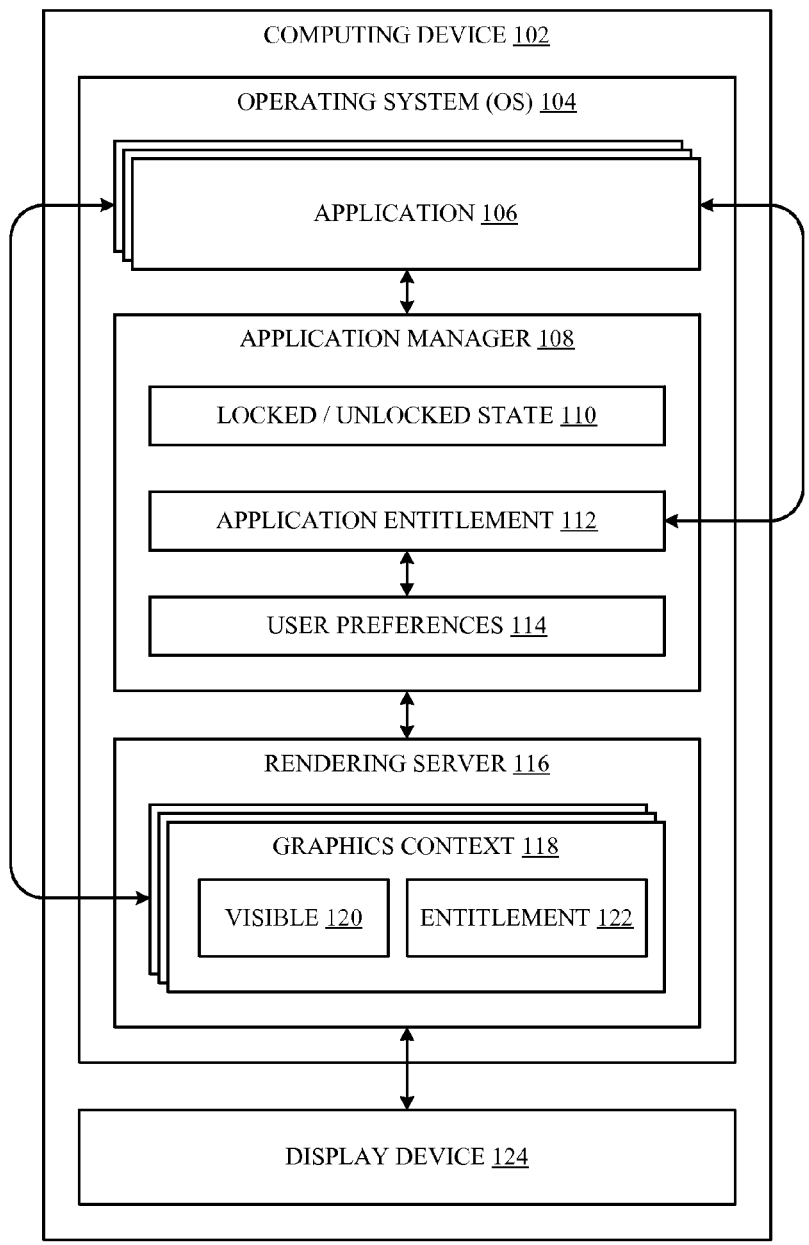
FIG. 1 illustrates a block diagram of different components of a system that is configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments disclosed herein set forth a technique for implementing a secure lock screen on a computing device. According to one embodiment, the secure lock screen is configured to permit particular applications to display their content—such as main user interfaces (UIs), or sub-UIs (referred to herein as widgets)—while maintaining a desired overall level of security on the computing device. To achieve the foregoing, graphics contexts—which represent drawing destinations that are associated with the applications executing on the computing device—are tagged with entitlement information that indicates whether or not each graphics context should be displayed on the computing device when the computing device is in a locked-mode. Specifically, an application manager tags each application that is initialized, where the tagging is based on a level of entitlement possessed by the application. This level of entitlement can be represented by, for example, a digital signature associated with the application, or by a preference established by a user of the computing device. In turn, a rendering server that manages the graphics contexts can identify the tagged entitlement information and display or suppress the content of the applications in accordance with their entitlements. In this manner, the secure lock screen can be implemented without requiring a complete lockdown of the computing device when in a locked-mode.

In some cases, it can be desirable to enable an entitled application—i.e., an application that is permitted to display content when the computing device is in a locked-mode—to display content of different applications that complement the entitled application. For example, a phone application is typically an entitled application since it is desirable to enable a user of the computing device to answer phone calls without first being required to input credentials to unlock the computing device when the computing device is in a locked-mode. Additionally, it is desirable for the phone application to be capable of accessing an address book application so that the user can lookup useful information when he or she is placing a phone call. Accordingly, one embodiment involves establishing a threshold level of depth—such as a depth level of one—that indicates a limit to a chain of entitlement when one application (e.g., the address book) inherits entitlement from another application (e.g., the phone application). In this manner, a child application can be displayed by an authorized application when the computing device is in a locked-mode, but the child application cannot display its own child application, since that would be a violation of the threshold level of depth that is implemented.

Additionally, in some cases, it can be desirable to obtain up-to-date snapshots of UIs of both entitled and unentitled applications while the computing device is in a locked-mode. These snapshots provide the benefit of enabling the application manager to efficiently provide to the user a visual representation of the various applications that are active on the computing device. If these snapshots were not periodically obtained by the application manager, the user would otherwise endure a lag while the application manager gathers the up-to-date snapshots in an on-demand manner, thereby degrading the user's overall experience. Accordingly, temporary visibility information can be assigned to the applications by the application manager to ensure that the snapshots are gathered even when the computing device is in a locked-mode and the applications are not entitled to be displayed when the computing device is in a locked-mode.

FIG. 1 illustrates a block diagram of different components of a system 100 that is configured to implement the various techniques described herein, according to some embodiments. As shown in FIG. 1, a computing device 102 executes an operating system 104 that is configured to execute various applications 106, an application manager 108, and a rendering server 116. The applications 106 can represent applications that are native to the OS 104, such as the applications that come pre-installed on the OS 104. The applications 106 can also represent third-party applications that are developed for the OS 104 and installed at a subsequent time, e.g., through an application store accessible through the OS 104.

The application manager 108 represents a system kernel of the OS 104 that is configured to orchestrate the manner in which the applications 106 execute on the computing device 102. Specifically, the application manager 108 is configured to launch and "kill" applications as the computing device 102 is operated by a user. This can involve, for example, initializing and launching applications when the computing device 102 is powered-on and the OS 104 is initialized, switching between applications based on user requests, and "killing" applications when appropriate. As shown in FIG. 1, the application manager 108 is configured to manage locked/unlocked state information 110, which can be used to indicate whether or not the computing device 102 is in a locked-mode or an unlocked-mode. The locked/unlocked state information 110 can be implemented using a variety of approaches, but in a simplest form can represent a binary value that indicates when the computing device 102 is in a locked-mode or when the computing device 102 is in an unlocked-mode. The application manager 108 can also include application entitlement information 112, which is used to identify the different applications 106 that are permitted to display information when the computing device 102 is in a locked-mode. According to one embodiment, the application entitlement information 112 can include encryption keys that are used to verify applications 106 that are digitally-signed to indicate that they are permitted to display information when the computing device 102 is in a locked-mode. The application manager 108 can further include user preferences information 114, which is used to identify applications 106 that may not be digitally signed as set forth above, but nonetheless have been authorized by a user of the computing device 102 to display content when the computing device 102 is in a locked-mode. According to one embodiment, the user preferences information 114 can be managed via a UI that enables the user to scroll through the applications 106 resident on the computing device 102 and individually select different applications 106 that he or she desires to access when the computing device 102 is in a locked-mode. For example, it may be desirable to the user to be able to access a third-party messaging application even when the device is in a locked-mode, especially when the user is not concerned about securing the content of the messaging application and is looking to reduce the rate at which he or she is required to unlock the computing device 102.

The rendering server 116 represents another system kernel of the OS 104 that is configured to render graphical content of the applications 106 and to cause the graphical content to be displayed on a display device 124 included in the computing device 102. Specifically, the rendering server 116 is configured to manage a variety of graphics contexts 118, where each graphics context 118 represents a drawing destination that is associated with an application 106. More specifically, each graphics context 118 defines basic drawing attributes such as the colors to use when drawing, a clipping area, line width and style information, font information, compositing options, and the like. This information can be maintained by the rendering server 116 so that render requests—such as UI updates—do not always need to be redundantly accompanied by information that rarely changes, thereby improving efficiency. As shown in FIG. 1, each graphics context 118 can include visible information 120 and entitlement information 122, which represent attributes of the graphics context 118 whose values are set by the application manager 108 throughout the operation of the computing device 102.

The visible information 120 indicates whether or not the graphics context 118 is visible or invisible on the display device 124 when the graphics context 118 is rendered by the rendering server 116. In particular, the application manager 108 can be configured to indicate that a graphics context 118 of an application 106 is invisible when the application manager 108 requests the rendering server 116 to obtain an up-to-date snapshot of the UI of the application 106. These snapshots provide the benefit of enabling the application manager 108 to efficiently provide to the user a visual representation of the various applications 106 that are active on the computing device 102. If these snapshots were not periodically obtained by the application manager 108, the user would otherwise endure a lag while the application manager 108 gathers the up-to-date snapshots in an on-demand manner, thereby degrading the user's overall experience. Accordingly, the visible information 120 can be used to ensure that the snapshots are gathered even when the computing device 102 is in a locked-mode.

Figure 2:
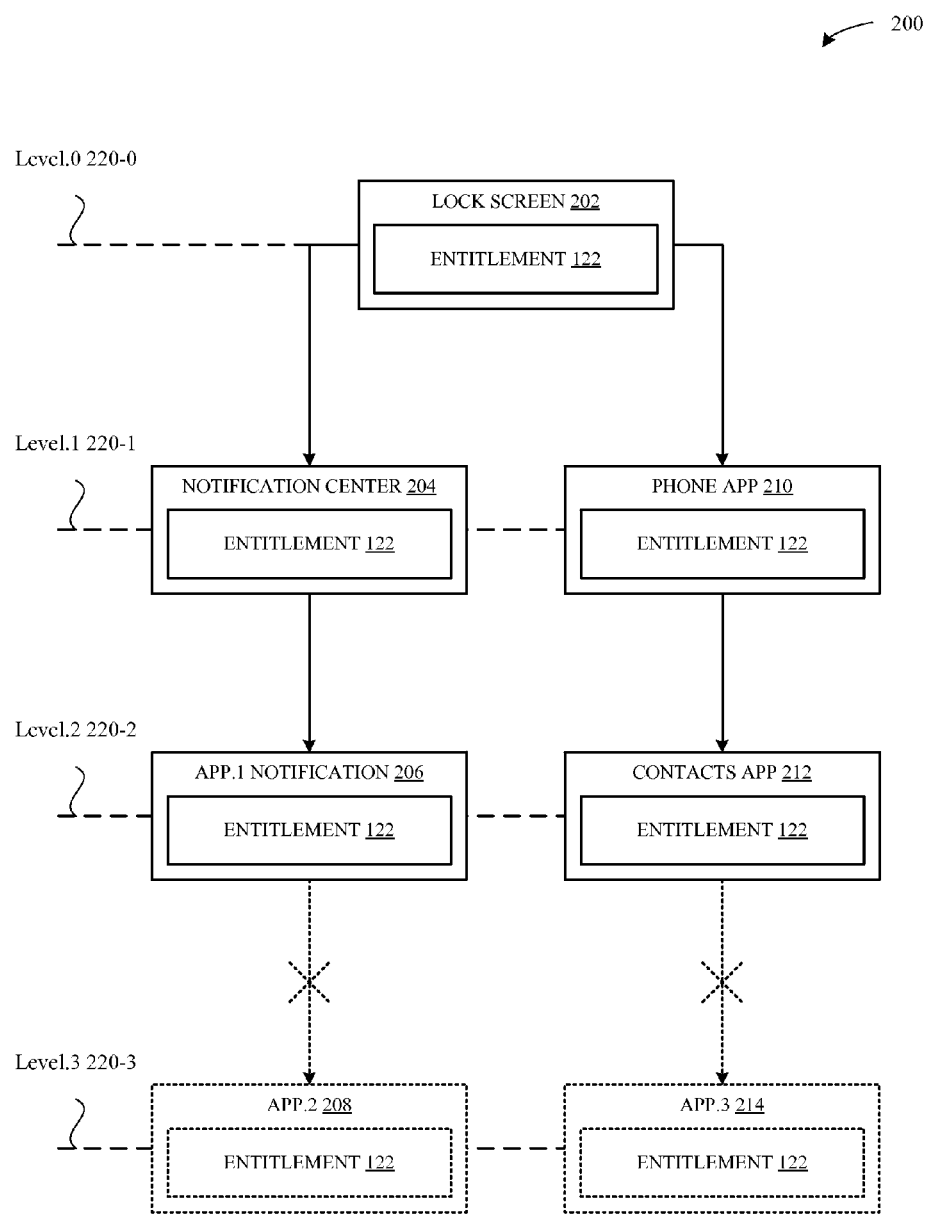
FIG. 2 illustrates a conceptual diagram for managing chains of entitlement, according to one embodiment.

The entitlement information 122 is used by the rendering server 116 to indicate whether or not the graphics context 118 should be rendered when the computing device 102 is in a locked-mode. The entitlement information 122 can also indicate a level of depth associated with the entitlement, which represents whether the entitlement of the application 106 is inherited by way of a chain of entitlement from other applications 106, and, if so, the depth of the entitlement within the chain. As described in greater detail below in conjunction with FIG. 2, the entitlement chain can be used to control the number of "child" applications—also referred to herein as "widgets"—that can be spawned/displayed in associated with an application 106 that is entitled to being displayed when the computing device 102 is in a locked-mode. More specifically, a threshold level of depth—which can be established by way of the application entitlement information 112—can be fine-tuned based on the amount of security that is desired to be enforced at the computing device 102. To implement tighter security, for example, the threshold level of depth can be set to one, such that applications are only permitted to display one child application 106. To implement looser security, for example, the threshold level of depth can be set to two, such that applications are permitted to display one to two child applications FIG. 2 illustrates a conceptual diagram 200 for managing chains of entitlement, according to one embodiment. Specifically, each of the nodes illustrated in FIG. 2 represent a graphics context 118, which, as shown, includes entitlement information 122. As shown in FIG. 2, a lock screen 202 represents a root node (as represented by level.0 220-0) that supersedes two different applications that are commonly available via the lock screen 202: a notification center 204, and a phone application 210 (as represented by level.1 220-1). In FIG. 2, each of the notification center 204 and the phone application 210 inherit, from the lock screen 202, their entitlement to be displayed when the computing device 102 is in a locked-mode. It is noted that, in FIG. 2, the threshold level of depth—which can be indicated by the entitlement information 122—is set at a value of two, such that any application 106 whose position in a chain of entitlement exceeds two applications, is prevented from displaying its content when the computing device 102 is in a locked-mode. Accordingly, as further illustrated in FIG. 2, an app.1 notification 206—which is at level.2 220-2, and represents a child application of the notification center 204—is permitted to display its content when the computing device 102 is in a locked-mode. Similarly, a contacts app 212—which is also at level.2 220-2, and represents a child application of the phone application 210—is also permitted to display its content when the computing device 102 is in a locked-mode. However, an app.2 208—which is at level.3 220-3—exceeds the threshold level of depth, and, therefore, the app.2 208 is prevented from displaying its content when the computing device 102 is in a locked-mode. Similarly, an app.3 214—which is also at level.3 220-3—exceeds the threshold level of depth, and, therefore, the app.3 214 is prevented from displaying its content when the computing device 102 is in a locked-mode.

Figure 3:
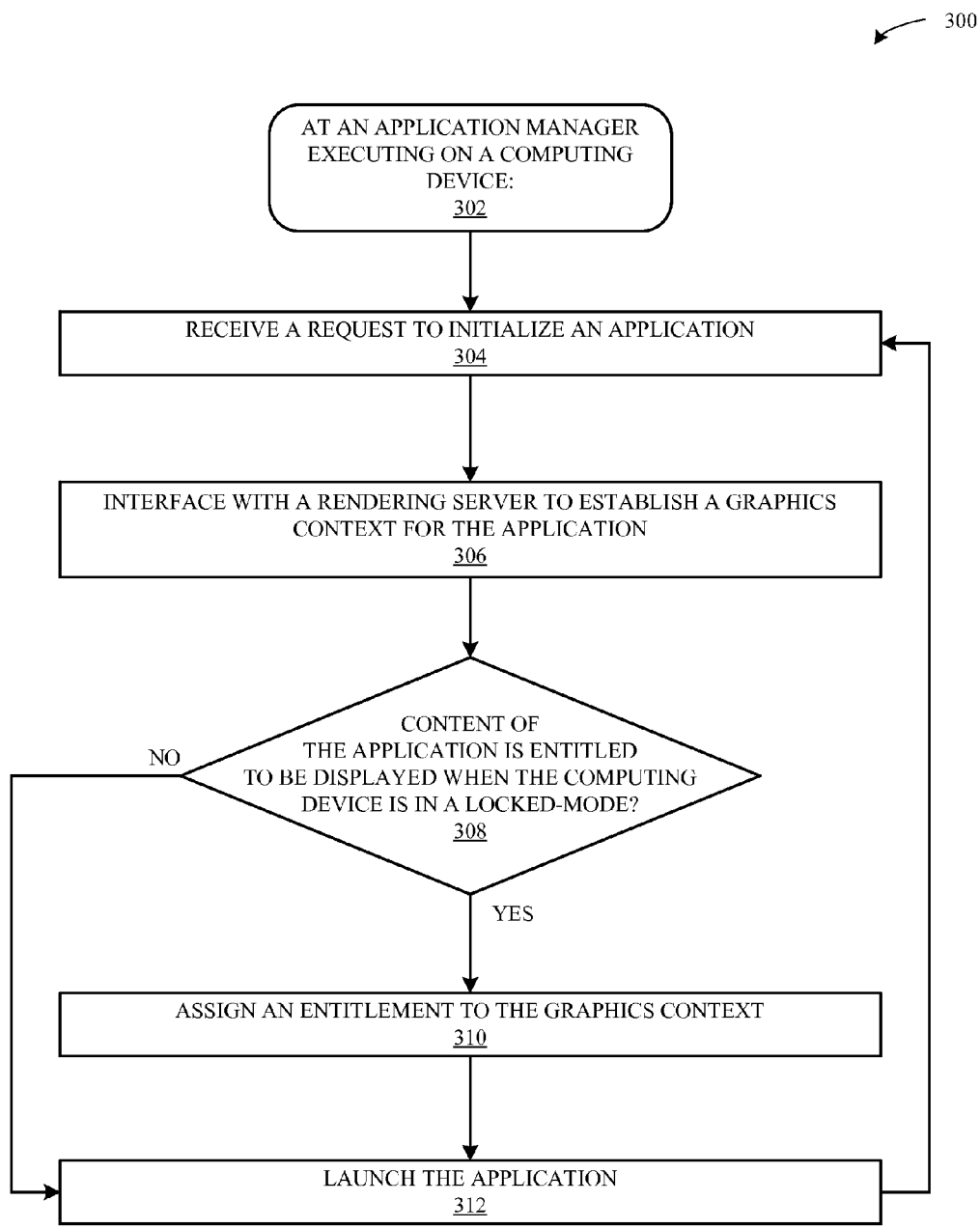
FIG. 3 illustrates a method for assigning entitlements to an application during an initialization of the application, according to one embodiment.

FIG. 3 illustrates a method 300 for assigning entitlements to an application during an initialization of the application, according to one embodiment. As shown, the method 300 begins at step 302, where the application manager 108 of the computing device 102 configures itself to carry out the various steps included in the method 300. Specifically, at step 304, the application manager 108 receives a request to initialize an application 106. Step 304 can occur, for example, for each application 106 that is native to the computing device 102 and launched when the computing device 102 is powered-on. Alternatively, step 304 can occur for third-party applications 106 that are launched by a user of the computing device 102 during regular usage of the computing device 102. At step 306, the application manager 108 interfaces with the rendering server 116 to establish a graphics context 118 for the application 106. As previously set forth herein, a graphics context 118 can represent a drawing destination that is associated with the application 106. Specifically, the graphics context 118 enables the application 106 to request the rendering server 116 to render content on the display device 124 included in the computing device 102.

At step 308, the application manager 108 determines whether content of the application 106 is entitled to be displayed when the computing device 102 is in a locked-mode. As previously set forth herein, the application manager 108 can be configured to reference the application entitlement information 112 to make the determination at step 308. This can include, for example, authenticating a digital signature associated with the application 106 to determine whether an authorized entity—such as the manufacturer of the computing device 102—deemed that the application 106 should be capable of displaying content when the computing device 102 is in a locked-mode. Alternatively—or additionally—the application manager 108 can be configured to reference the user preferences information 114 to determine whether the user of the computing device 102 has approved the application 106 to display content when the computing device 102 is in a locked-mode. This can involve, for example, the user accessing a preferences UI that enables the user to enable or disable each application 106 resident on the computing device 102 from displaying content when the computing device 102 is in a locked-mode.

If, at step 308, the application manager 108 determines that content of the application 106 is entitled to be displayed when the computing device 102 is in a locked-mode, then the method 300 proceeds to step 310. Otherwise, the method 300 proceeds to step 312, where the application manager 108 launches the application 106 without assigning an entitlement to the application 106. Without this entitlement, and when the computing device 102 is in a locked-mode, the rendering server 116 will suppress any content from being displayed by the graphics context 118 associated with the application 106.

As indicated above, if, at step 308, the application manager 108 determines that content of the application 106 is entitled to be displayed when the computing device 102 is in a locked-mode, then the method 300 proceeds to step 310, where the application manager 108 assigns an entitlement to the graphics context 118. With this entitlement, and when the computing device 102 is in a locked-mode, the rendering server 116 will enable content to be displayed by the graphics context 118 associated with the application 106. Finally, at step 312, the application manager 108 launches the application 106.

Figure 4:
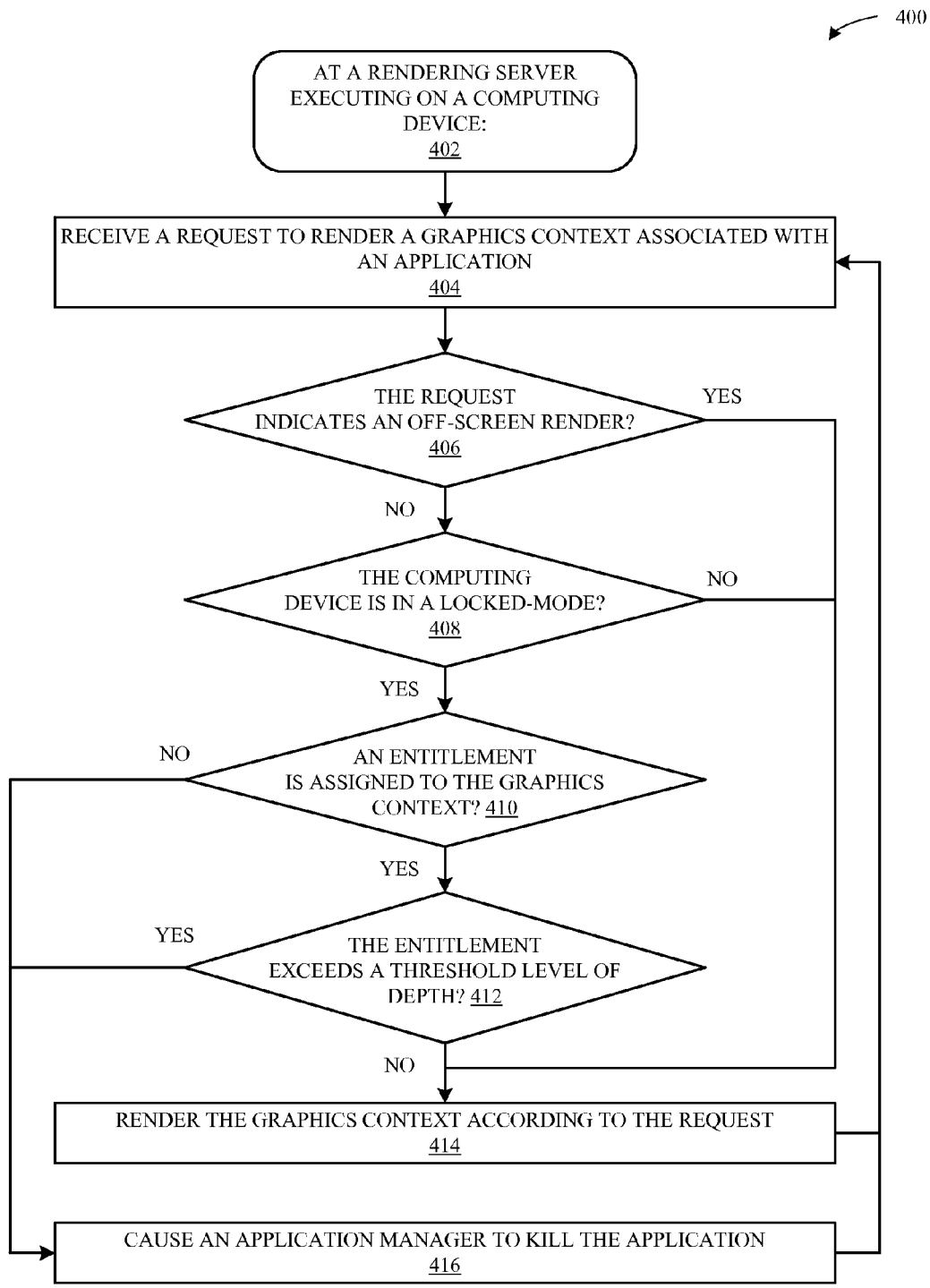
FIG. 4 illustrates a method for managing the manner in which the content of an application is displayed, according to one embodiment.

FIG. 4 illustrates a method 400 for managing the manner in which the content of an application 106 is displayed, according to one embodiment. As shown, the method 400 begins at step 402, where the rendering server 116 of the computing device 102 configures itself to carry out the various steps included in the method 400. Specifically, at step 404, the rendering server 116 receives a request to render a graphics context 118 associated with an application 106. Typically, such a request is frequently received by the rendering server 116 when the computing device 102 is being utilized by the user, including when the computing device 102 is in a locked-mode or an unlocked-mode.

At step 406, the rendering server 116 determines whether the request received at step 404 indicates an off-screen (i.e., invisible) render, e.g., as indicated by visible information 120 associated with the graphics context 118. As previously set forth above, the computing device 102 can be configured to periodically obtain up-to-date snapshots of UIs of applications 106 that are actively executing on the computing device 102. These snapshots provide the benefit of enabling the user to efficiently view his or her applications—e.g., via an application switch UI—without having to endure the lag that would otherwise occur when having to wait for each application 106 to provide the up-to-date snapshot. For this reason, when off-screen render requests are received by the rendering server 116, the rendering server 116 processes the off-screen render requests regardless of whether the computing device 102 is in a locked-mode or an unlocked-mode. Accordingly, if, at step 406, the rendering server 116 determines that the request indicates an off-screen render, then the method 400 proceeds to step 414, where the rendering server 116 renders the graphics context 118 according to the request. Otherwise, the method 400 proceeds to step 408.

At step 408, after the rendering server 116 determines the request does not indicate an off-screen render, the rendering server 116 determines whether the computing device 102 is in a locked-mode. The rendering server 116 can make this determination according to a variety of techniques, e.g., by referencing the locked/unlocked state information 110 managed by the application manager 108, or by managing local state that is regularly updated to reflect the locked/unlocked state information 110. If, at step 408, the rendering server 116 determines that the computing device 102 is in a locked-mode, then the method 400 proceeds to step 410. Otherwise, the method 400 proceeds to step 414, where the rendering server 116 renders the graphics context 118 according to the request.

At step 410, the rendering server 116 determines whether an entitlement is assigned to the graphics context 118. As previously set forth herein, the entitlement of the graphics context 118 can be indicated by the entitlement information 122 that is associated with the graphics context 118. Specifically, the entitlement information 122 can indicate whether or not the graphics context 118 should be rendered when the computing device 102 is in a locked-mode. The entitlement information 122 can also indicate a level of depth associated with the entitlement, which represents whether the entitlement of the application 106 is inherited by way of a chain of entitlement from other applications 106, and, if so, the depth of the entitlement within the chain. If, at step 410, the rendering server 116 determines that an entitlement is assigned to the graphics context 118, then the method 400 proceeds to step 412. Otherwise, the method 400 proceeds to step 416, where the rendering server 116 causes the application manager 108 to "kill" the application 106, since the application 106 is improperly attempting to display content when the computing device 102 is in a locked-mode.

At step 412, the rendering server 116 determines whether the entitlement exceeds a threshold level of depth. As previously set forth herein, the threshold level of depth can be managed by the entitlement information 122, and can be fine-tuned based on the amount of security that is desired to be enforced at the computing device 102. To implement tighter security, for example, the threshold level of depth can be set to one, such that applications are only permitted to display one child application 106. To implement looser security, for example, the threshold level of depth can be set to two, such that applications are permitted to display one to two child applications 106. If, at step 412, the rendering server 116 determines that the entitlement does not exceed the threshold level of depth, then the method 400 proceeds to step 414, where the rendering server 116 renders the graphics context 118 according to the request. Otherwise, the method 400 proceeds to step 416, where the rendering server 116 causes the application manager 108 to "kill" the application 106, since the application 106 exceeds the threshold level of depth.

Figure 5:
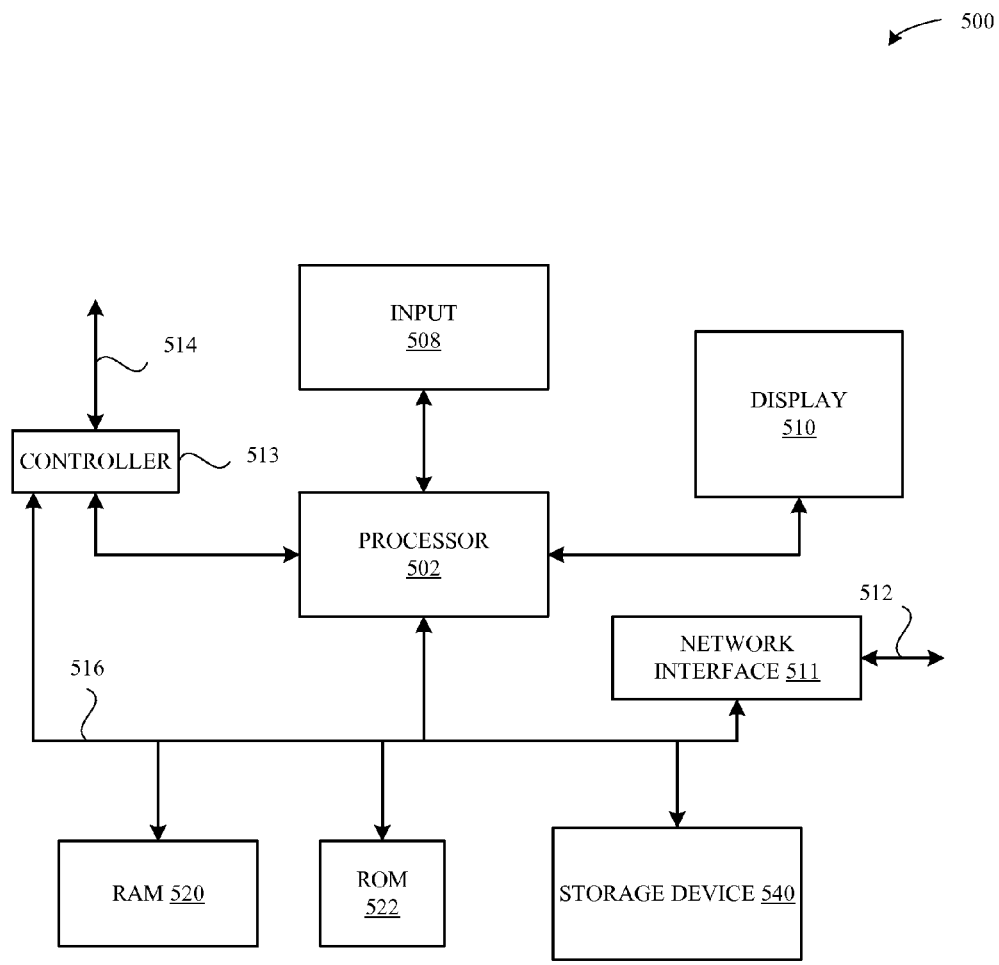
FIG. 5 illustrates a detailed view of a computing device that can be used to implement the various components described herein, according to some embodiments.

FIG. 5 illustrates a detailed view of a computing device 500 that can be used to implement the various components described herein, according to some embodiments. In particular, the detailed view illustrates various components that can be included in the computing device 102 illustrated in FIG. 1. As shown in FIG. 5, the computing device 500 can include a processor 502 that represents a microprocessor or controller for controlling the overall operation of computing device 500. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also includes a storage device 540, which can comprise a single disk or a plurality of disks (e.g., hard drives), and includes a storage management module that manages one or more partitions within the storage device 540. In some embodiments, storage device

540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for implementing a secure lock screen, the method comprising, at a computing device that is in a locked-mode:
   receiving a first request to launch a first application, wherein the first application is associated with a first entitlement that indicates:
      a first graphics context for the first application that is permitted to be displayed when the computing device is in the locked-mode, and
      a first depth level for the first application that indicates a first position of the first application within a hierarchy;
   displaying the first graphics context within the secure lock screen in response to determining that the first depth level satisfies a threshold;
   receiving a second request to launch a second application, wherein the second application is associated with a second entitlement that indicates:
      a second graphics context for the second application that is permitted to be displayed when the computing device is in the locked-mode, and
      a second depth level that is inherited from the first depth level, wherein the second depth level reflects a second position of the second application within the hierarchy; and
   displaying the second graphics context for the second application within the secure lock screen in response to determining that the second depth level satisfies the threshold.

2. The method of claim 1, wherein:
   the first graphics context includes at least a first subset of content that is displayed within a first primary graphics context for the first application that is displayed when the computing device is in an unlocked-mode, and
   the second graphics context includes at least a second subset of content that is displayed within a second primary graphics context for the second application that is displayed when the computing device is in the unlocked-mode.

3. The method of claim 1, wherein the threshold is based on a user preference.

4. The method of claim 1, wherein the first application causes an issuance of the second request to launch the second application.

5. The method of claim 1, further comprising:
   transitioning into the locked-mode prior to receiving the first request.

6. The method of claim 1, wherein the first graphics context is a drawing destination associated with the first application, and the first graphics context is rendered by a rendering server included in the computing device.

7. The method of claim 6, wherein, when the second depth level does not satisfy the threshold, the method further comprises:
   assigning a property to the second graphics context that indicates to the rendering server that the second graphics context is not visible.

8. A non-transitory computer readable storage medium configured to store instructions that, when executed by a processor included in a computing device, cause the computing device to implement a secure lock screen while the computing device is in a locked-mode, by carrying out steps that include:
   receiving a first request to launch a first application, wherein the first application is associated with a first entitlement that indicates:
      a first graphics context for the first application that is permitted to be displayed when the computing device is in the locked-mode, and
      a first depth level for the first application that indicates a first position of the first application within a hierarchy;
   displaying the first graphics context within the secure lock screen in response to determining that the first depth level satisfies a threshold;
   receiving a second request to launch a second application, wherein the second application is associated with a second entitlement that indicates:
      a second graphics context for the second application that is permitted to be displayed when the computing device is in the locked-mode, and
      a second depth level that is inherited from the first depth level, wherein the second depth level reflects a second position of the second application within the hierarchy; and
   displaying the second graphics context for the second application within the secure lock screen in response to determining that the second depth level satisfies the threshold.

9. The non-transitory computer readable storage medium of claim 8, wherein:
   the first graphics context includes at least a first subset of content that is displayed within a first primary graphics context for the first application that is displayed when the computing device is in an unlocked-mode, and the second graphics context includes at least a second subset of content that is displayed within a second primary graphics context for the second application that is displayed when the computing device is in the unlocked-mode.

10. The non-transitory computer readable storage medium of claim 8, wherein the threshold is based on a user preference.

11. The non-transitory computer readable storage medium of claim 8, wherein the first application causes an issuance of the second request to launch the second application.

12. The non-transitory computer readable storage medium of claim 8, wherein the first graphics context is a drawing destination associated with the first application, and the first graphics context is rendered by a rendering server included in the computing device.

13. The non-transitory computer readable storage medium of claim 12, wherein, when the second depth level does not satisfy the threshold, the steps further include:
assigning a property to the second graphics context that indicates to the rendering server that the second graphics context is not visible.

14. A computing device configured to implement a secure lock screen while the computing device is in a locked-mode, the computing device comprising:
a display device;
a processor; and
a memory configured to store instructions that, when executed by the processor, cause the computing device to carry out steps that include:
receiving a first request to launch a first application, wherein the first application is associated with a first entitlement that indicates:
a first graphics context for the first application that is permitted to be displayed when the computing device is in the locked-mode, and
a first depth level for the first application that indicates a first position of the first application within a hierarchy;
displaying the first graphics context within the secure lock screen in response to determining that the first depth level satisfies a threshold;
receiving a second request to launch a second application, wherein the second application is associated with a second entitlement that indicates:
a second graphics context for the second application that is permitted to be displayed when the computing device is in the locked-mode, and
a second depth level that is inherited from the first depth level, wherein the second depth level reflects a second position of the second application within the hierarchy; and
displaying the second graphics context for the second application within the secure lock screen in response to determining that the second depth level satisfies the threshold.

15. The computing device of claim 14, wherein:
the first graphics context includes at least a first subset of content that is displayed within a first primary graphics context for the first application that is displayed when the computing device is in an unlocked-mode, and
the second graphics context includes at least a second subset of content that is displayed within a second primary graphics context for the second application that is displayed when the computing device is in the unlocked-mode.

16. The computing device of claim 14, wherein the threshold is based on a user preference.

17. The computing device of claim 14, wherein the first application causes an issuance of the second request to launch the second application.

18. The computing device of claim 14, wherein the first graphics context is a drawing destination associated with the first application, and the first graphics context is rendered by a rendering server included in the computing device.

19. The computing device of claim 18, wherein, when the second depth level does not satisfy the threshold, the steps further include:
assigning a property to the second graphics context that indicates to the rendering server that the second graphics context is not visible.

20. The computing device of claim 14, wherein the steps further include: transitioning into the locked-mode prior to receiving the first request.

* * * * *